US008925043B2

(12) United States Patent
Hildebrand

(10) Patent No.: US 8,925,043 B2
(45) Date of Patent: Dec. 30, 2014

(54) SCALABLE FINE-GRAINED MULTI-SERVICE AUTHORIZATION

(75) Inventor: Joseph J. Hildebrand, Denver, CO (US)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 13/545,081

(22) Filed: Jul. 10, 2012

(65) Prior Publication Data

US 2014/0020064 A1   Jan. 16, 2014

(51) Int. Cl.
*H04L 29/06*   (2006.01)

(52) U.S. Cl.
USPC ................................................. 726/4; 726/5

(58) Field of Classification Search
CPC .... H04L 63/10; H04L 9/32; G06F 2221/2141
See application file for complete search history.

(56) References Cited

U.S. PATENT DOCUMENTS

| | | | |
|---|---|---|---|
| 5,708,780 A | | 1/1998 | Levergood et al. |
| 7,137,006 B1* | | 11/2006 | Grandcolas et al. ......... 713/180 |
| 7,272,639 B1 | | 9/2007 | Levergood et al. |
| 2002/0112155 A1 | | 8/2002 | Martherus et al. |
| 2003/0028798 A1 | | 2/2003 | Burnett |
| 2007/0233957 A1 | | 10/2007 | Lev-Ran et al. |
| 2009/0150474 A1* | | 6/2009 | Schneider ..................... 709/201 |
| 2011/0277026 A1 | | 11/2011 | Agarwal et al. |
| 2013/0086645 A1* | | 4/2013 | Srinivasan et al. ................ 726/4 |
| 2013/0103694 A1* | | 4/2013 | Luong et al. .................. 707/747 |

OTHER PUBLICATIONS

Apple Inc., "Authorization Services Programming Guide," Oct. 19, 2011, pp. 1-42.
Lear, et al, "A SASL & GSS-API Mechanism for OpenID," draft-ietf-kitten-sasl-openid-08, Network Working Group, Internet-Draft, Standards Track, Feb. 24, 2012, pp. 1-18.
Jones, et al., "The OAuth 2.0 Authorization Protocol: Bearer Tokens," draft-ietf-oauth-v2-bearer-19, OAuth Working Group, Internet-Draft, Standards Track, Apr. 23, 2012.
Cisco Systems, Inc, Cisco Identity Services Engine API Reference Guide, Release 1.0.4, Sep. 2011, pp. 1-70.
Melnikov, et al., "Simple Authentication and Security Layer (SASL)," Network Working Group, RFC 4422, Standards Track, Jun. 2006, pp. 1-33.

(Continued)

*Primary Examiner* — Izunna Okeke
(74) *Attorney, Agent, or Firm* — Edell, Shapiro & Finnan, LLC

(57) ABSTRACT

A scalable cross-protocol mechanism is provided for describing, transmitting and checking large lists of authorizations for operations on network resources. At an authorization server, data is stored that represents operations that can be performed on a plurality of resources of a service provider at the request of one or more users. A set of {resource,operations} tuples is generated, wherein a resource describes an endpoint for a network service and operations is a list of operations that are authorized on an endpoint. The set of {resource,operations} tuples is partitioned into one or more subsets. A subset of the set of {resource,operations} tuples is combined into a string according to a predetermined rule. A hash is then computed, according to a hash function, to generate hash results. Hashes are passed instead of the lists themselves to minimize data transfer and latency.

26 Claims, 12 Drawing Sheets

(56) References Cited

OTHER PUBLICATIONS

Wierenga, et al., "A Simple Authentication and Security Layer (SASL) and GSS-API Mechanism for the Security Assertion Markup Language (SAML)," IETF, RFC 6595, Standards Track, Apr. 2012, pp. 1-22.

Cisco Systems, Inc, Cisco Identity Services Engine API Reference Guide, Release 1.1, Mar. 2012, pp. 1-78.

eXtensible Access Control Markup Language 3 (XACML) Version 2.0, OASIS Standard, Feb. 1, 2005, pp. 1-141.

Hildebrand et al,, XEP-0115: Entity Capabilities, Version 1.5, XMPP Standards Foundation Feb. 8, 2006.

International Search Report and Written Opinion in counterpart International Application No. PCT/US2013/034922, mailed Jul. 9, 2013.

\* cited by examiner

SCALABLE FINE-GRAINED MULTI-SERVICE AUTHORIZATION

TECHNICAL FIELD

The present disclosure relates to providing authorized access to software services.

BACKGROUND

When running a large Software-as-a-Service (SaaS) provider, there are often many services created by disparate teams running over different network protocols that need to appear as a coherent set of products/services to customers, partners, and the larger developer community that will use that set of subservices as a platform. A primary challenge for some SaaS providers is obtaining a centralized identity service, so that there is one user name and authentication mechanism (e.g., password) that works across all of the subservices. Once a user is identified, the next hurdle is to determine which, if any, services the user is authorized to access.

Several authorization systems that have been built in the past assume that if a user can access the service, there are a very fixed set of static permissions for which pieces of the service the user is entitled to use. This approach does not always work well, particularly for enterprises which prefer very fine-grained control over which users can use each feature of a service. Often, these enterprises like to use groups or roles to assign similar permissions to sets of users.

For security reasons, authorization decisions are performed server-side, since client applications are under control of untrusted parties, perhaps having been written entirely by untrusted parties in a fully-realized developer community scenario. However, clients often want to know what operations they are allowed to perform, so that they can disable or remove the portions of the user experience that the user is not allowed to access, rather than waiting for the user to try something that is going to fail.

In many enterprises, there are hundreds of millions of users and thousands of servers. With aggressive virtualization, services may be distributed across hundreds of thousands of servers. Therefore, complex, tightly-coupled, or centralized processing is best kept to a minimum. In particular, on the server side, the latency requirement dictates that processing can be simplified and calls to other internal services can be kept to a minimum.

DESCRIPTION OF EXAMPLE EMBODIMENTS

Overview

A scalable cross-protocol mechanism is provided for describing, transmitting and checking large lists of authorizations for operations on network resources. At an authorization server, data is stored that represents operations that can be performed on a plurality of resources of a service provider at the request of one or more users. A set of {resource,operations} tuples is generated, wherein a resource describes an endpoint for a network service and operations is a list of operations that are authorized on an endpoint. The set of {resource,operations} tuples is partitioned into one or more subsets. A subset of the set of {resource,operations} tuples is combined into a string according to a predetermined rule. A hash is then computed, according to a hash function, to generate hash results.

Example Embodiments

Figure 1:
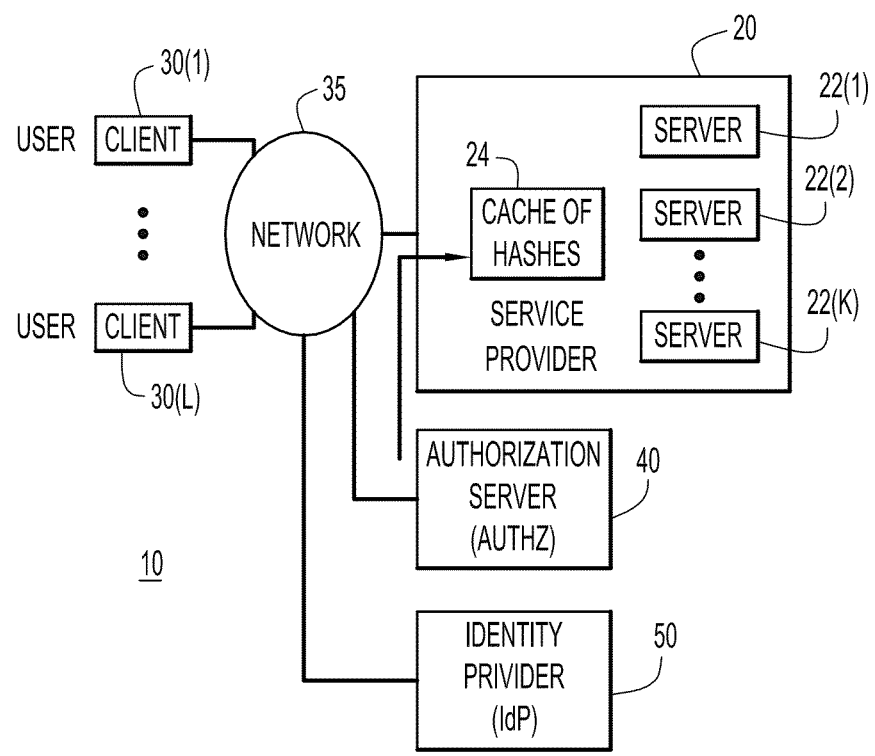
FIG. 1 is a block diagram of a system in which the highly scalable service authorization control techniques may be used.

Referring first to FIG. 1, a block diagram is shown of a system 10 in which a service provider 20 communicates with one or more clients 30(1)-30(L) by way of a network 35 to provide software services to one or more of the clients 30(1)-30(L). The service provider 20 has, or has access to, a plurality of servers 22(1)-22(K), physical and/or virtual, that can provide software services to the clients 30(1)-30(L). The servers 22(1)-22(K) need not be co-located and need not be completely under control of the service provider. The network 35 may consist of one or more local area networks (wired and wireless) and one or more wide area networks (wired and wireless).

The clients 30(1)-30(L) are software applications that are running on a device such as a desktop computer, laptop computer, tablet computer, server computer, smartphone, or any other apparatus on which an application (called a client application herein) is running that at some point in time, involves a user accessing a service provided by the service provider 20. A user may be a person, or another computing apparatus.

For purposes of this description, the following terminology is defined.

A "resource" is a concrete, self-contained piece of functionality that is the smallest unit of authorization. A "resource" describes an endpoint for a network service.

An "operation" is a separate action that is authorized to be performed on a resource (endpoint). For example, in Hypertext Transport Protocol (HTTP)-based systems, this might correspond to the HTTP method used for the request.

A "{resource,operations} tuple" thus defines an endpoint for a network service and a collection of operations authorized on the endpoint. A {resource,operations} tuple is also referred to herein as a "ResOp".

A "service provider" offers services that consist of one or more operations on each of one or more resources.

A "token service" or "authorization service" is an entity trusted by the service provider to ensure that authentication has succeeded. The authorization service generates and signs tokens. The authorization service is provided/supported by an authorization server 40 shown in FIG. 1.

An "identity provider" is a system/entity that authenticates users and maps them to identities that can be processed by the authorization service. The identity provider (IdP) is shown at reference numeral 50 in FIG. 1.

A "client" is, as explained above, software application or process that uses the services provided by the service provider, after having communicated with the identity provider and authorization service.

An "authorization token" or "token" is a time-limited list of permissions that entitles the bearer to access a long list of discreet services.

When a user is provisioned to have access to a set of services provided by one or more service providers, a token service or authorization service (e.g., the authorization server 40) is given a list of protocols, host names, resources, and operations on those resources that are involved in that user having access. The authorization service does not need to know what semantic is associated with these ResOps. The service provider 20 may also inject extension data, which will be available to the service provider later in the process.

The ResOps lists described above can be very long in a real-world complex system, to the point where the length of the list would make the system impractical. However, the number of combinations of resources and operations used in practice are usually quite limited. Instead of passing around long lists, a pointer to the list is distributed as needed. One such pointer to the list can be constructed by ordering the list canonically (according to a predetermined rule), converting it to a canonical bytestream, e.g., using a JavaScript Object Notation (JSON) as set forth in RFC 4627, and performing a cryptographically-strong hash over the bytestream. These hashes can then be exchanged instead of the lists. Using the hash as a verification mechanism, any actor in the system that knows the original data that corresponded to the hash can then act as a trusted source of that information, leading to highly optimized transport of that data. For example, if an entity refers to a given hash in its capabilities description, that entity can be assumed to know the set of {resource,operations} tuples described by the hash. The service provider 20 stores a cache of hashes, shown at reference numeral 24 in FIG. 1, for facilitating the distribution of authorization information to clients, as described in further detail hereinafter.

When the client accesses an authorization service (AuthZ) provided by the authorization server 40 for the first time, normal single-service authentication/authorization is performed (e.g., OAuth), perhaps involving the separate IdP 50.

Figure 2:
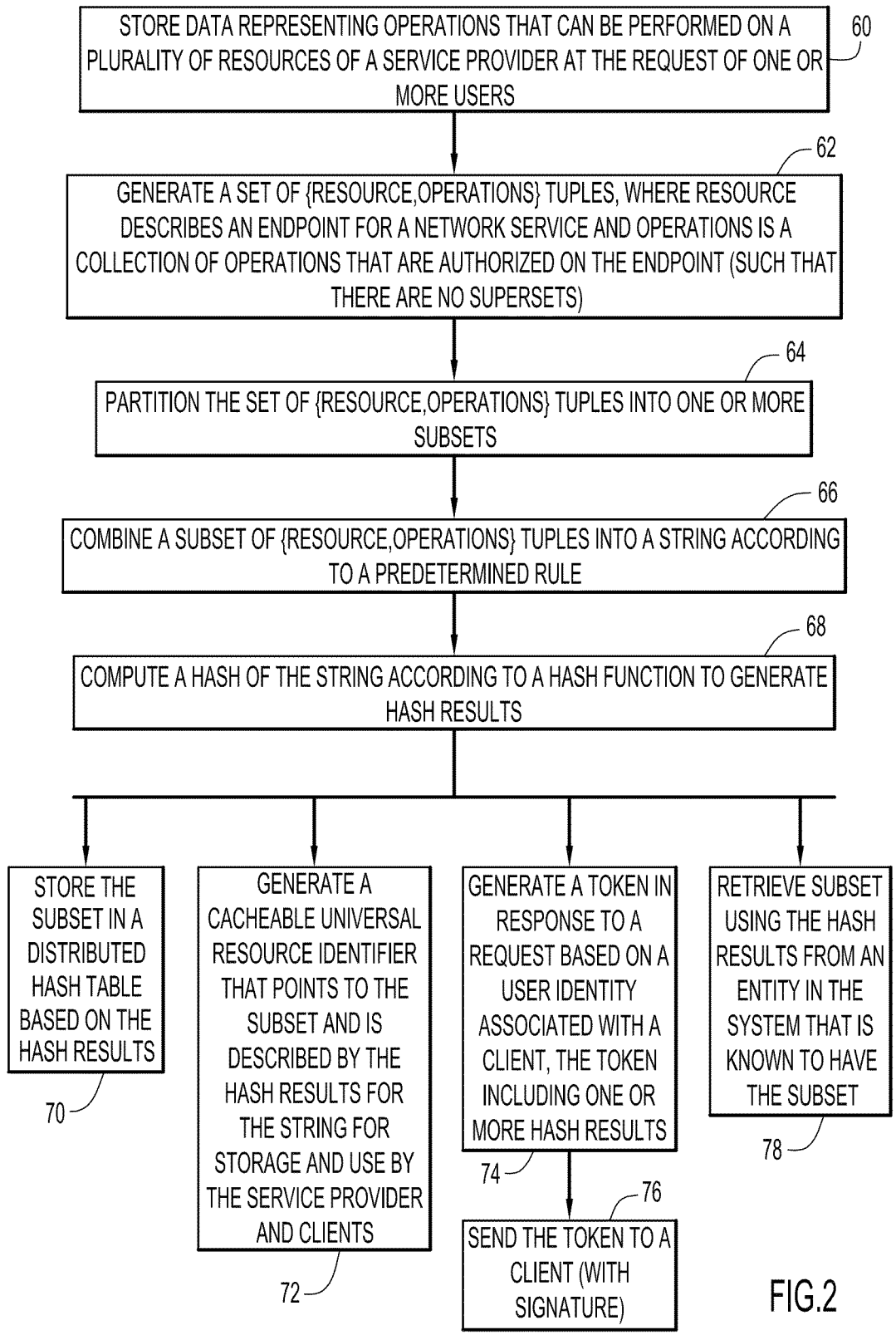
FIG. 2 is a flow chart generally depicting operations of the highly scalable service authorization control techniques.
Figure 3:
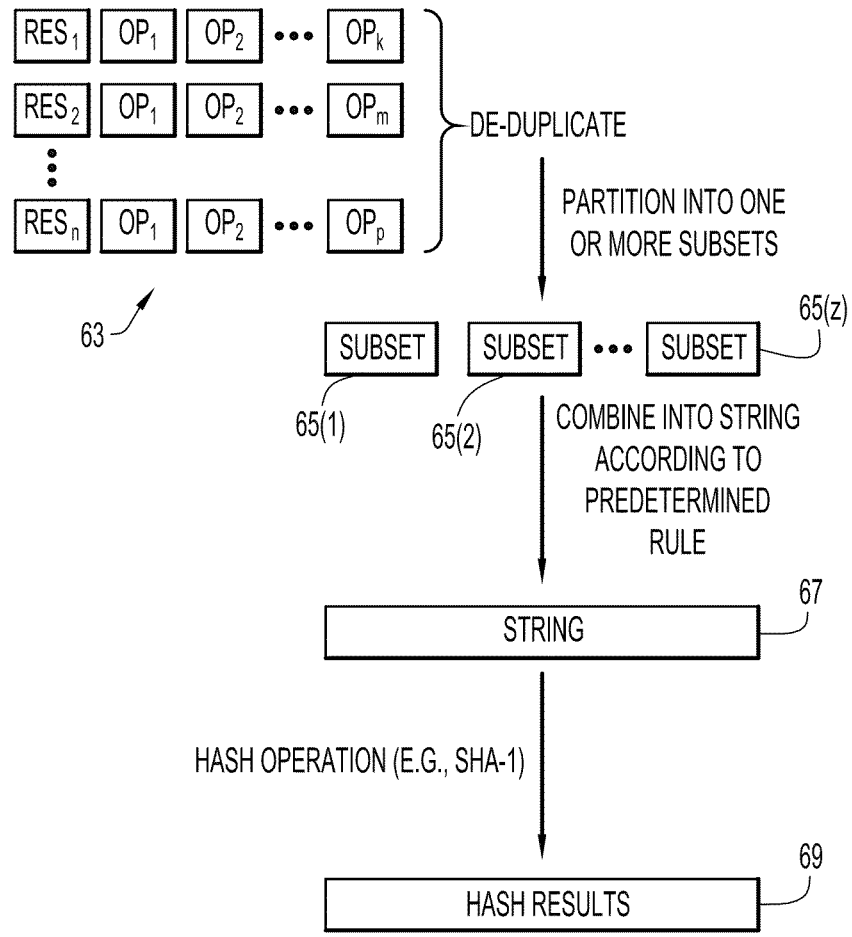
FIG. 3 is a diagram pictorially representing steps to compress a large number of {resource,operations} tuples into hashed results.

Reference is made to FIGS. 2 and 3. FIG. 2 shows a flow chart for operations performed at the authorization server 40, for example. FIG. 3 provides a pictorial representation of these operations. At 60, data is stored that represents operations that can be performed on a plurality of resources of a service provider, at the request of one or more users. At 62, a set of {resource,operations} tuples is generated that are authorized on a resource (endpoint), where, again, a "resource" defines an endpoint for a network service and "operations" is a collection of operations that are authorized on the endpoint. FIG. 3 shows a set of {resource,operations} tuples 63 comprising resource 1 ($Res_1$) and operation 1 ($Op_1$)-operation k ($Op_k$) that are authorized on $Res_1$, and $Op_1$-$Op_m$ that are authorized on $Res_2$, ..., and $Op_1$-$Op_p$ that are authorized on $Res_n$.

For HTTP, the resource may be specified by a Universal Resource Locator (URL), and the operation may be a request method, e.g., GET, POST, etc. Other protocols may specify their own operations, e.g., publish/subscribe, etc. The authorization server 40 treats resource and operations as opaque.

An example of a {resource,operations} tuple syntax is as follows:

```
[{ "res": "/auth/*",
     "ops": ["GET", "POST"]},
   { "res": "/meetings/**",
        "ops": ["DELETE", "GET", "POST"]},
     { "res": "/print",
     "ops": ["DELETE", "POST"]}
   ... (MANY)]
```

In this example, one resource hierarchy is /auth/* and the operations on this resource are GET and POST. Another deeper resource hierarchy is /meetings/** and the operations on this resource are DELETE, GET and POST. An explicit resource is /print that has operations DELETE and POST.

At 64, the set of {resource,operations} tuples 63 are de-duplicated and then partitioned into one or more subsets, shown at 65(1)-65(z) in FIG. 3. The partitioning operation may be performed so as to minimize the number of subsets needed to describe authorizations across a user population. For example, the set of {resource,operations} tuples 63 is separated into one or more subsets so as to minimize the number of subsets and maximize the number of hash collisions so that the hash results cache optimally, as described further hereinafter. In so doing, there will be as few hashes alive or active in the system at any one time so that they cache more optimally.

The authorization server may compute an optimal set of ResOps subsets by looking for common patterns. Imagine a spectrum of subset sizes from one (where each user would need thousands of subsets) to the number of users (where each user would get a different subset, and no caching can occur). The optimal number of subsets will minimize the token size and maximize the number of cache hits using feedback from the number of times a subset is requested, the number of times that subset is given out, and cross-organizational scans for the most common subsets used.

At 66, at least one subset of {resource,operations} tuples is combined into a string according to a predetermined rule, e.g., alphabetical sorting, followed by JSON serialization. The string is shown at reference numeral 67 in FIG. 3. An example of a string for the example {resource,operations} tuple given above is (note: no newlines are intended in the below example):

```
[{"res": "/auth/*", "ops": ["GET", "POST"]}, {"res": "/meetings/**",
"ops": ["DELETE", "GET", "POST"]}, {"res": "/print", "ops":
["DELETE", "POST"]}]
```

At 68, a hash of the string is computed, using a hash function, to generate hash results. For example, the hash function may be a Secure Hash Algorithm 1 (SHA1) hash, an MD5 function, etc. The hash results are generically shown at reference numeral 69 in FIG. 3. The hash results may converted to a string of characters. For the example string referred to above, the string of characters for the hash results (derived from a SHA1 hash) is:

d669e4c30a1b9d360f86786ee448cd71bcf9dd6c

There are several possibilities/options for use of the hash results. First, at 70, the subset of {resource,operations} tuples may be stored in a distributed hash table based on the hash results. A distributed hash table (DHT) provides a lookup service that stores (key, value) pairs, and any participating device/entity can efficiently retrieve the value associated with a given key. Responsibility for maintaining the mapping from keys to values is distributed among the entities, in such a way that a change in the set of participants causes a minimal amount of disruption. Thus, a DHT can scale to large numbers of entities. The DHT may be maintained by memory in the authorization server 40 or service provider 20, or some other entity/device in the system.

Another possibility is, as shown at 72, to generate a cacheable Universal Resource Identifier (URI) that points to the subset of {resource,operations} tuples and is described by the hash results for the string, for storage and use by the service provider and clients. An example of a cacheable URI for the hash results example provided above is https://authz/d669e4c30a1b9d360f86786ee448cd71bcf9dd6c. The cacheable URI may be cacheable via a network protocol.

Still another possibility is, at 74, to generate a token in response to a request based on a user identity associated with a client. The token includes one or more hash results. At 76, the token is sent to the client (with a signature generated from the contents of the token).

Yet another possibility, as shown at 78, is to retrieve, the subset of {resource,operations} tuples using the hash results from any entity that is known to have the subset of {resource, operations} tuples. In other words, a client can request any entity to provide the subset, using the hash results, if the client has some knowledge that that entity should have the subset.

Figure 4:
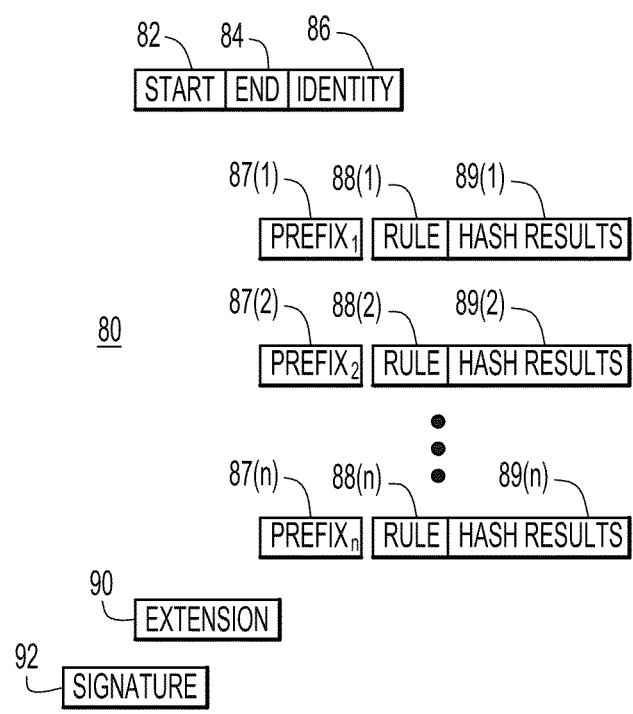
FIG. 4 is a diagram illustrating an example of a token that is built from hash results of {resource,operations} tuples.

Reference is now made to FIG. 4 for a description of a token. A token, shown generally at reference numeral 80, includes data indicating time validity specifying the time period during which the token is valid, in the form of a start time field 82 and an end time field 84. There is an identity field 86 that identifies the user for which the token is intended. After the identity field there are one or more sets of ResOps fields, each set comprising a prefix field, a rule field and a hash results field, e.g., prefix$_1$ 87(1), rule 88(1), and hash results 89(1), prefix$_2$ 87(2), rule 88(2), and hash results 89(2) . . . , prefix$_n$ 87(n), rule 88(n), and hash results 89(n). The prefix field specifies the initial portion of the resource and is to be combined with the resource suffixes in the ResOp set by simple concatenation. Moreover, the token is usable on/by a plurality of service providers. The prefix fields indicate on which one or more service providers the token may be used. In the example token given below, the prefix "http://cisco.webex.com" refers to one service provider, while the prefix "http://go.webex.com" refers to another service provider. The rule field specifies a rule associated with the resource, such as allow, deny, or other rules, such as delegate. The hash results field contains the hash results for a subset of {resource,operations} tuples. Thus, there is a list of hash results, each having an associated prefix and rules for the operations indicated in the hash results. There is also an extension field 90 after the ResOps fields. The extension field 90 contains additional data provided by a service provider upon provisioning, such as inputs to other more complicated authorization schemes. The signature field 92 contains a cryptographic signature computed across all of the other fields shown in FIG. 4, and may be optional in some applications.

Set forth below is an example token syntax:

```
{ "start": "2011-12-20T02:08:50Z",
"end": "2011-12-20T06:08:50Z",
"identity":
"https://ident.cluster1/86bcc11f-7684-4529-b2dc-a25e1c6eaf51",
"resops": [{"prefix": "http://cisco.webex.com",
    "rule": "allow":
    "hash": "d669e4c30a1b9d360f86786ee448cd71bcf9dd6c"},
    {"prefix": "http://go.webex.com",
    "rule": "allow":
    "hash": "d669e4c30a1b9d360f86786ee448cd71bcf9dd6c"}],
"{http://example.com/network}location": "inside-firewall"}
+ signature
```

Figure 5:
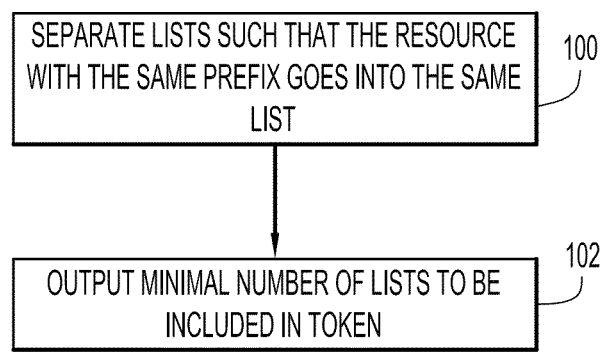
FIG. 5 is a flow chart generally depicting additional operations performed to minimize the number of lists included in a token.

Turning now to FIG. 5, a flow chart is described for techniques to minimize redundancy of data in the token by selecting a subset of {resource,operations} tuples that minimizes redundancy. At 100, in generating the token, the lists of hash results may be separated such that the resource with the same prefix goes into the same list. At 102, the minimal number of lists is output for inclusion in the token.

Multiple users will have the same set of authorizations. If the system maximizes the number of times that the same ResOp set occurs, more efficient caching can be performed on the hash of that set. There are several mechanisms which can increase the number of collisions.

First, the ResOp set is shared between users of the system. Second, the Universal Resource Locator (URL) prefix (e.g., scheme://hostname:port) can be removed from the hash, thereby reusing the hash across machines. Third, new lists with different prefixes can be added rather than creating a new, longer list. Fourth, allowing resources to apply hierarchically with * (match up to the next "special" character, like '/') and ** (match all resources that start with this resource). In addition, excess ResOps whose resource and operation match can be removed. Further still, ResOps that are more restrictive than a higher-level authorization which grants access to that same feature can be removed. For example ["/top/*", ["GET","PUT"]] contains ["/top/next", ["GET"]], so the latter is redundant and may be removed.

Figure 6:
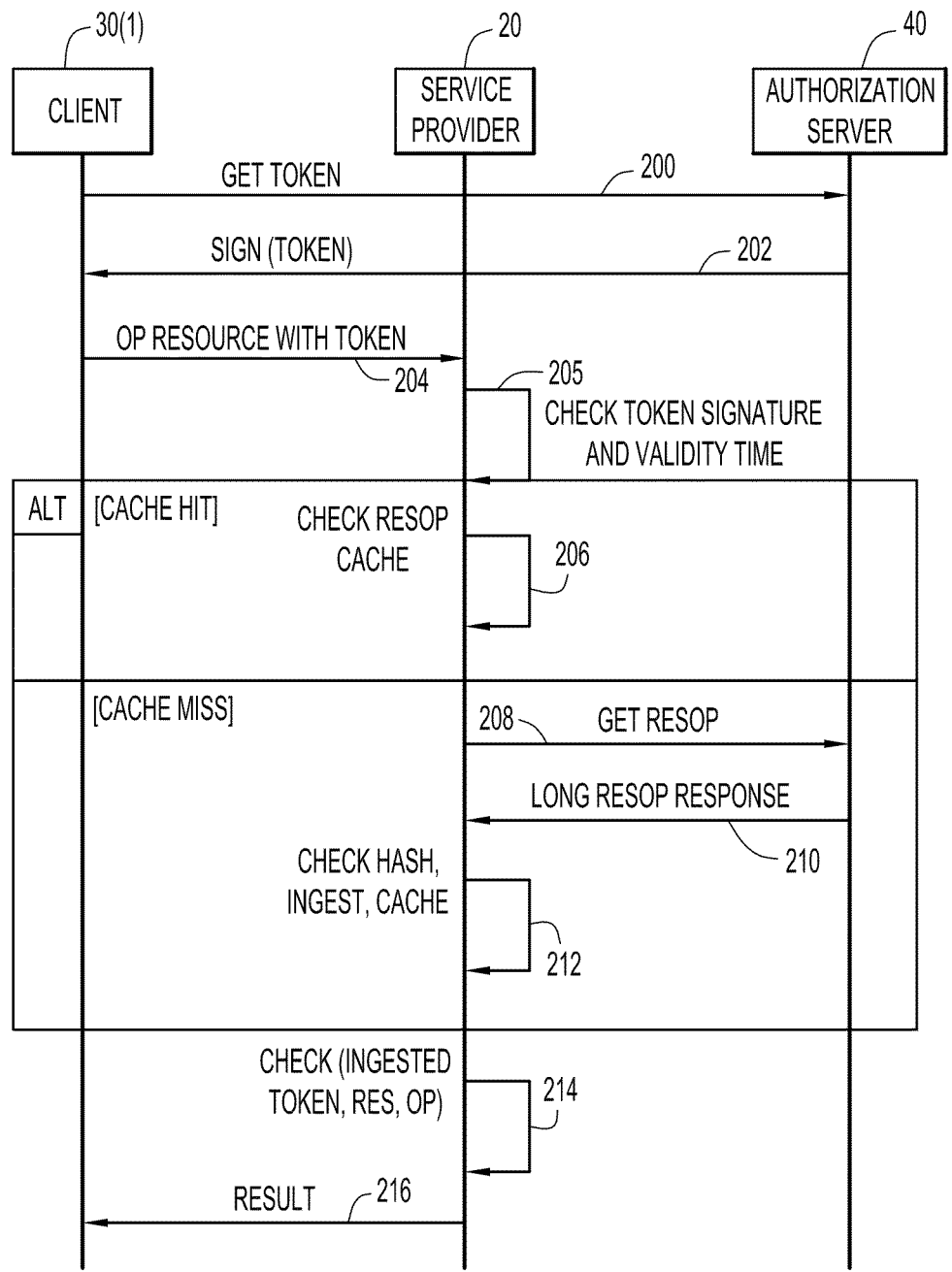
FIG. 6 is a sequence diagram generally depicting the communications between a client, service provider and authorization server in connection with the highly scalable service authorization control techniques described herein.

Reference is now made to FIG. 6, which illustrates an overall flow diagram for the operations performed by a client 30(1), the service provider 20 and authorization server 40. At 200, the client sends a request, GetToken, to obtain a token from the authorization server 40. At 202, the authorization server 40 sends the token (optionally signed), to the client 30(1).

The client provides the token every time it performs an operation on a resource of a service provider. Thus, a 204, the client 30(1) sends the token with a request to perform an operation on a resource to the service provider 20. At 205, the service provider 20 checks the signature of the token and its validity time to determine that the signature is valid and that it is not expired. If the signature and/or validity time is not valid, then the process stops, and an appropriate message is sent to the client notifying the client of the token validity failure. If the signature and time validity check passes, then at 206, the service provider can grant access to one or more resources and operations on the service provider, and the service provider checks its ResOp cache to see if the operation requested is in its ResOp cache. If it is in the ResOp cache, then the processing continues at 214. If it is not in the ResOp cache, then at 208, the service provider sends a request to get the ResOp, Get ResOp, to the authorization server 40. At 210, the authorization server responds by sending the entire set of {resource,operations} tuples as described above in connection with FIGS. 1 and 2, for the service provider 20, and the associated hash results, computed by the authorization server.

At 212, the service provider checks the hash results sent by the authorization server 40, and if the hash results are consistent with the set of {resource,operations} tuples contained in the response sent at 210, then the service provider 20 can store them in its ResOp cache.

At 214, the service provider 20 checks to ensure that the ResOp desired is allowed in the token, and otherwise satisfies any rules in the token. If the ResOp is not allowed or does not otherwise satisfy specified rules in the token, an error message is returned to the client. At 216, the service provider performs the requested service operation and sends the results to the client 30(1), if the service operation worked as desired.

Once all of the ResOp lists pointed to in the token are cached and pre-processed, the checks at 206 and 214 can be performed quite rapidly, without accessing a service running on a separate machine. When cache hits are common, the system can perform well at scale, allowing bounds on memory usage by any given process by aging the least-recently-used ResOp lists out of the cache.

The Application Programming Interface (API) framework to support the operations depicted in FIG. 6 include APIs to check token validity, de-reference ResOp URI, check hash results, as well as matching a host/source to an operation (via an URI).

Clients need to be able to determine what actions the current user is authorized to perform, in order to optimize the user experience. The mechanism specified above for the service provider is simple enough such that clients may have their own implementations. Removing the need for the client to constantly inquire if a feature is authorized substantially reduces server traffic.

Clients will also examine the contents of the token to retrieve the expiry times (indicated by the start and stop time fields) so that they can generate a new token before the old one expires. A further refinement will allow notification via a publish/subscribe mechanism when the authorization server detects that an existing token is no longer valid.

None of the operations described herein require the authorization server 40 to understand anything about HTTP (e.g., the valid operations) or HTTP: URLs. Non-HTTP service providers can create string representations of their resources and operations in a consistent fashion, often using an available URI scheme as the encoding process.

Figure 7:
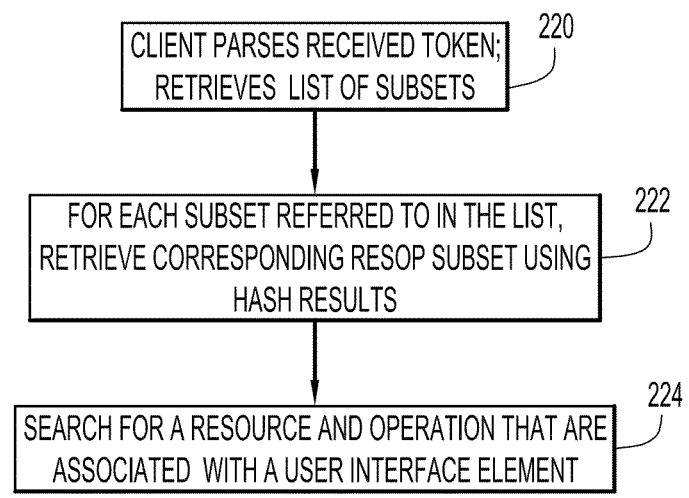
FIG. 7 is a flow chart depicting an example of how a client may process a token when a resource and operation specified in the token is associated with a user interface element.
Figure 8:
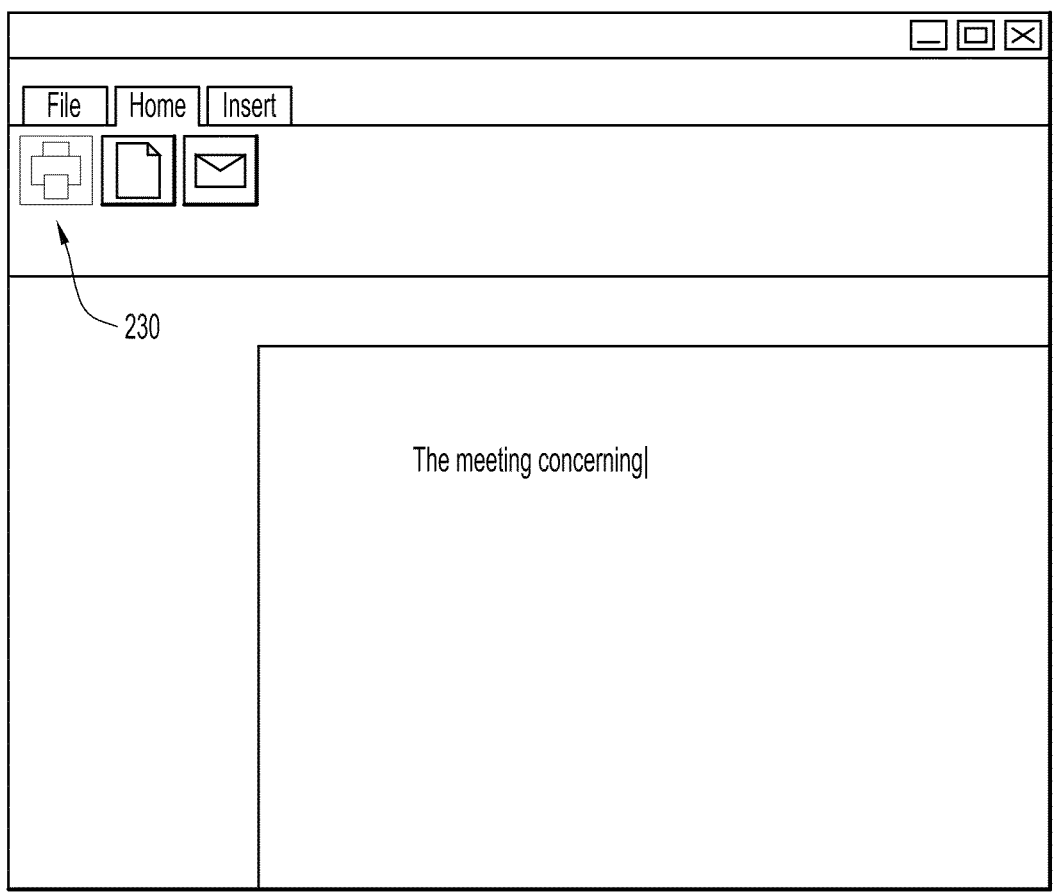
FIG. 8 is a diagram generally illustrating how a user interface element on a client's display may be grayed-out if that resource is not authorized for the client.

Reference is now to FIGS. 7 and 8 for an example of how a client may use a received token. At 220, the client parses a token received from the authorization server 40 and retrieves the list of subsets from the token. At 222, the client retrieves, for each hash results in the list (in the token), the corresponding ResOp subset. At 224, the client searches for a resource and an operation that are associated with a user interface element. For example, as shown in FIG. 8, the resource and operation that the client can perform is a print resource, e.g., the aforementioned explicit resource/print that has operations DELETE and POST, for which a print icon 230 is displayed. The client searches for that resource and operation in each of the ResOps subsets retrieved in 222. If that resource and operation is found, the client is authorized for the print resource. Otherwise, the print icon 230 is grayed-out or opaque, as shown in FIG. 8.

Thus, FIGS. 7 and 8 show that a client gets/refreshes tokens from the authorization server and maps ResOps to user interface elements, such that unauthorized resources may be indicated as a removed or gray-out user interface element.

Figure 9:
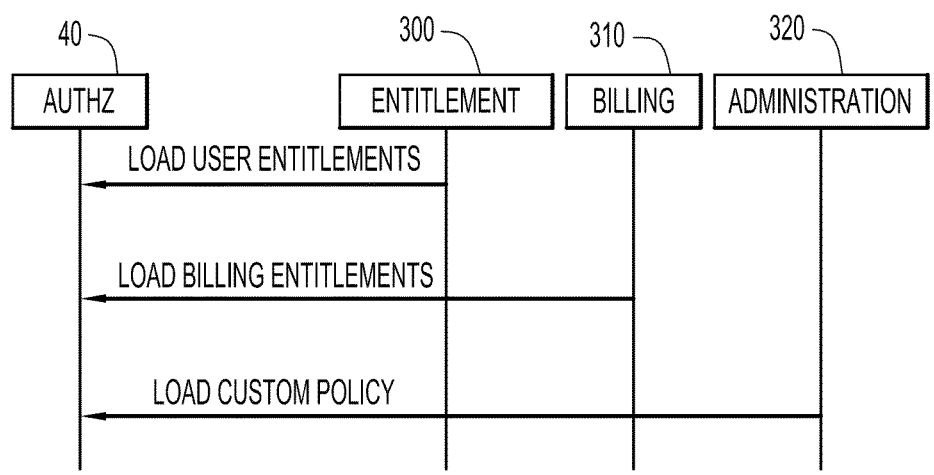
FIG. 9 is a sequence diagram generally illustrating how resources and operations are loaded into the authorization server from a variety of sources.

Turning now to FIG. 9, a diagram is shown that depicts how ResOps are loaded into the authorization server 40. ResOps may be injected into the authorization server 40 from a variety of resources, including entitlement 300, billing 310, administration 320, and other entities, such as security, etc. The entitlement server 300 will load user entitlements, the billing server will load billing entitlements and the administration server 320 will load custom organizational policies. The authorization server 40 will then build the set of {resource, operations} tuples, and can use this information to generate and sign tokens at the request of clients.

Figure 10:
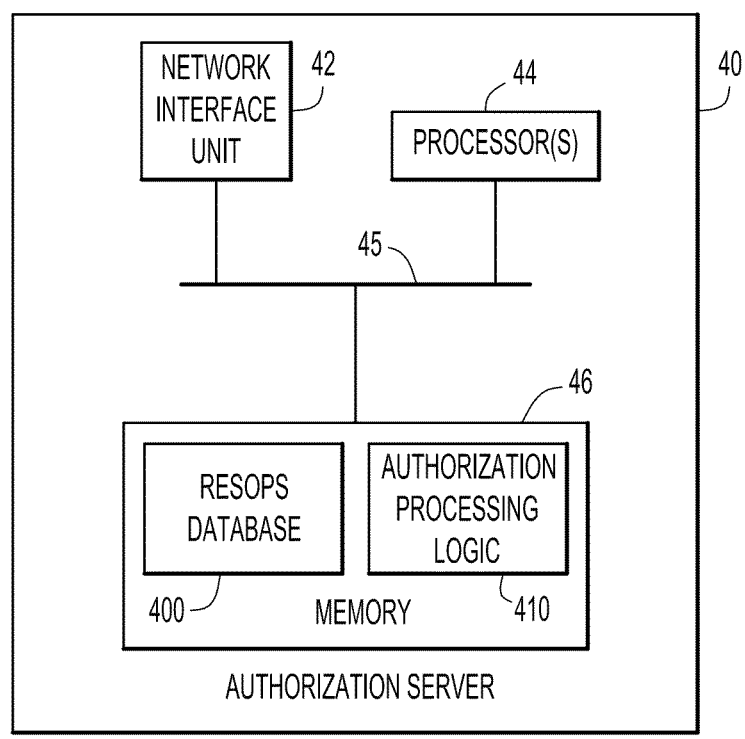
FIG. 10 is an example block diagram of the authorization server configured to perform the techniques described herein.

FIG. 10 illustrates an example of a block diagram for the authorization server 40. The authorization server 40 comprises a network interface unit 42 to enable network communications with clients, the service provider and other entities, a processor (or several processors) 44, a bus 45 and a memory 46. The memory 46 stores a ResOps database 400, which contains all of the ResOps that have been injected into the authorization server 40 from various sources, as described above in connection with FIG. 9. The memory also stores processor executable (software) instructions for authorization processing logic 410. The authorization processing logic 410 comprises instructions, that when executed by the processor 44, cause the processor to perform the various operations described herein in connection with FIGS. 1-9.

Figure 11:
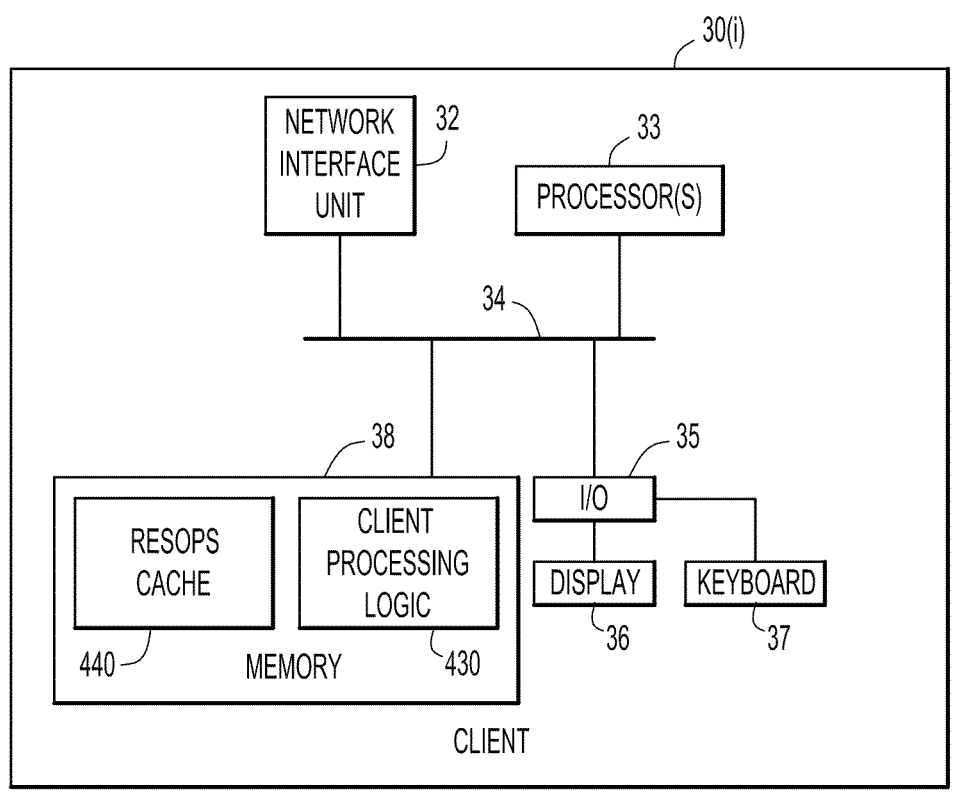
FIG. 11 is an example block diagram of a client configured to perform the client-side techniques described herein.

FIG. 11 illustrates an example block diagram for a client, e.g., generically identified by reference numeral 30($i$). The client comprises a network interface unit 32 configured to enable network communications, one or more processor(s) 33, a bus 34, an input/output (I/O) controller 35, a display 36, a keyboard (and mouse) 37, and a memory 38. The memory 38 stores processor executable instructions for client processing logic 430 and also stores a ResOps cache 440. The client processing logic 430 comprises instructions, that when executed by the processor(s) 33, cause the processor(s) to perform the various client operations described herein, including those described above in connection with FIGS. 6, 7 and 8.

Figure 12:
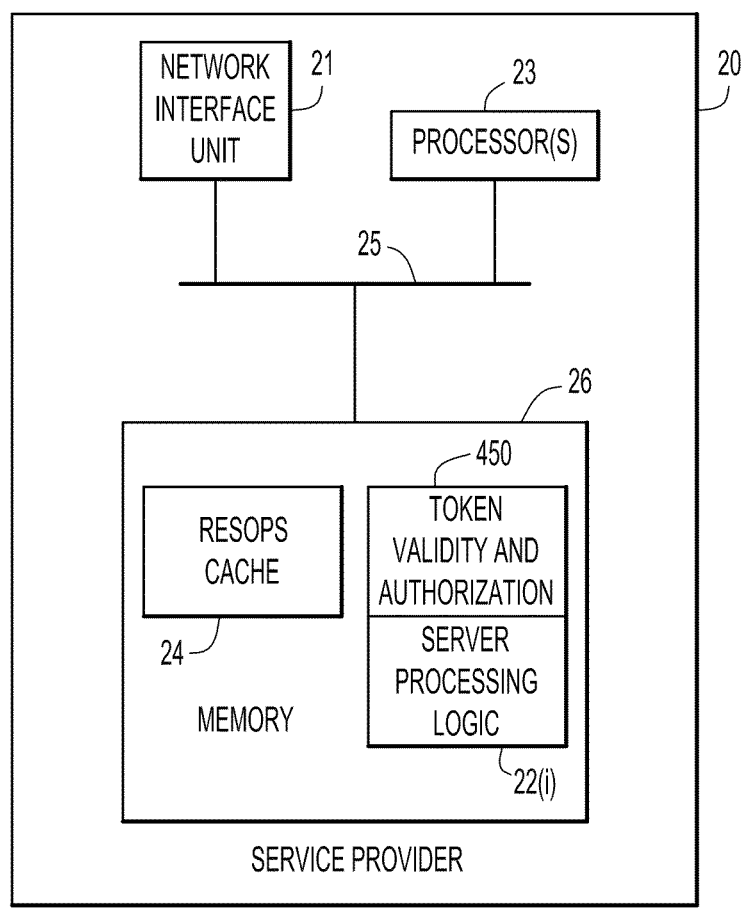
FIG. 12 is an example block diagram of a service provider computing apparatus configured to perform the server-side techniques described herein.

FIG. 12 illustrates an example block diagram for the service provider 20. The service provider 20 includes, in one example at least one computing apparatus that includes a network interface unit 21, one or more processors 23, a bus 25 and a memory 26. The memory 26 stores the aforementioned ResOps cache 24, and software instructions for server processing logic 22($i$) for one or more services and software instructions for token validity and authorization shown at reference numeral 450. The server processing logic 22($i$) is meant to generically represent any server process that is offered by the service provider 20. The token validity and authorization module 450 comprise instructions that enable the service provider to verify the validity and authorization of a token.

The memories 46, 38 and 26 shown in FIGS. 10-12 may comprise read only memory (ROM), random access memory (RAM), magnetic disk storage media devices, optical storage media devices, flash memory devices, electrical, optical, or other physical/tangible (e.g., non-transitory) memory storage devices. The processors 140 shown in FIGS. 10-12 are, for example, a microprocessor or microcontroller that executes instructions in their associated memory. Thus, in general, the memories 46, 38 and 26 may comprise one or more tangible (non-transitory) computer readable storage media (e.g., a memory device) encoded with software comprising computer executable instructions and when the software is executed (by a processor) it is operable to perform the operations described herein.

In summary, disclosed herein is a scalable, performant, cross-protocol mechanism for describing, transmitting, and checking large lists of authorizations for operations on network resources. This mechanism drastically reduces the size of tokens that would otherwise contain exhaustive lists of all of the authorizations required to access a service. This allows the mechanism to be used for much finer-grained authorizations without sacrificing latency of processing.

The above description is intended by way of example only.

What is claimed is:

1. A method comprising:
   at an authorization server, storing data representing operations that can be performed on a plurality of resources of a service provider at the request of users of a user population;
   generating a set of {resource,operations} tuples, wherein a resource describes an endpoint for a network service and operations is a list of operations that are authorized on the endpoint;
   de-duplicating the set of {resource,operations} tuples to eliminate duplicate tuples;
   partitioning the de-duplicated set of {resource,operations} tuples into one or more subsets to minimize the number of subsets needed to describe authorizations across the user population and maximize a number of hash collisions in hash results to be computed across the one or more subsets;
   combining a subset of the set of {resource,operations} tuples into a string according to a predetermined rule;
   computing a hash of the string according to a hash function to generate hash results; and
   in response to a request from a client, generating from the request a token that includes a list of one or more hash results each associated with a prefix to indicate a service provider on which the subset of {resource,operations} tuples corresponding to the hash result may be used, wherein the generating includes selecting a subset of {resource,operations} tuples that minimizes redundancy of data in the token and minimizes token size.

2. The method of claim 1, further comprising storing the subset in a distributed hash table of {resource,operations} tuples based on the hash results that is accessible to the service provider so that the service provider is able to retrieve the subset using the hash results.

3. The method of claim 1, further comprising generating a cacheable universal resource indicator that points to the subset and is described by the hash results for the string for storage and use by the service provider and clients.

4. The method of claim 3, wherein the universal resource indicator is cacheable via a network protocol.

5. The method of claim 1, further comprising retrieving subset using the hash results from an entity in the system that is known to have the subset.

6. The method of claim 1, further comprising generating a signature for content of the token by the authorization server.

7. The method of claim 6, further comprising sending the token with the signature to the client.

8. The method of claim 7, further comprising the service provider receiving the token sent by the client, and checking the validity of the token to determine whether to grant access to one or more resources and operations.

9. The method of claim 7, wherein the token is usable by a plurality of service providers.

10. The method of claim 9, further comprising the client determining on which one or more service providers the token may be used based on prefix fields in the token.

11. The method of claim 1, further comprising receiving the token and storing the one or more hash results contained in the token.

12. The method of claim 11, further comprising:
    at the client, parsing the received token;
    for each hash results in the list, retrieving the corresponding subset; and
    searching for a resource and operation that are associated with a user interface element.

13. The method of claim 1, further comprising generating a notification via a notification mechanism such as publish/subscribe mechanism when it is determined that an existing token is no longer valid.

14. One or more computer readable storage media encoded with software comprising computer executable instructions and when the software is executed operable to:
    store data representing operations that can be performed on a plurality of resources of a service provider at the request of users in a user population;
    generate a set of {resource,operations} tuples, wherein a resource describes an endpoint for a network service and operations is a list of operations that are authorized on the endpoint;
    de-duplicate the set of {resource,operations} tuples do eliminate duplicate tuples;
    partition the de-duplicated set of {resource,operations} tuples into one or more subsets to minimize the number of subsets needed to describe authorizations across the user population and maximize a number of hash collisions in hash results to be computed across the one or more subsets;
    combine a subset of the set of {resource,operations} tuples into a string according to a predetermined rule;
    compute a hash of the string according to a hash function to generate hash results; and
    in response to a request from a client, generate from the request a token that includes a list of one or more hash results each associated with a prefix to indicate a service provider on which the subset of {resource,operations} tuples corresponding to the hash result may be used, wherein the generation of the set of {resource,operations} tuples includes selecting a subset of {resource,operations} tuples that minimizes redundancy of data in the token and minimizes token size.

15. The computer readable storage media of claim 14, further comprising instructions operable to generate a notification via a publish/subscribe mechanism when it is determined that an existing token is no longer valid.

16. The computer readable storage media of claim 14, further comprising instructions operable to generate a cacheable universal resource indicator that points to the subset and is described by the hash results for the string for storage and use by the service provider and clients.

17. An apparatus comprising:
    a network interface unit configured to enable network communications;
    a memory;
    a processor coupled to the network interface unit and the memory, wherein the processor is configured to:
        store in the memory data representing operations that can be performed on a plurality of resources of a service provider at the request of users in a user population;
        generate a set of {resource,operations} tuples, wherein a resource describes an endpoint for a network service and operations is a list of operations that are authorized on the endpoint;

de-duplicate the set of {resource,operations} tuples to eliminate duplicate tuples;

partition the de-duplicated set of {resource,operations} tuples into one or more subsets to minimize the number of subsets needed to describe authorizations across the user population and maximize a number of hash collisions in hash results to be computed across the one or more subsets;

combine a subset of the set of {resource,operations} tuples into a string according to a predetermined rule;

compute a hash of the string according to a hash function to generate hash results; and in response to a request from a client, generate from the request a token that includes a list of one or more hash results each associated with a prefix to indicate a service provider on which the subset of {resource, operations} tuples corresponding to the hash result may be used, wherein generating the set of {resource, operations} tuples includes selecting a subset of {resource,operations} tuples that minimizes redundancy of data in the token and minimizes token size.

18. The apparatus of claim 17, wherein the processor is configured to store the subset in a distributed hash table of {resource,operations} tuples based on the hash results that is accessible to the service provider so that the service provider is able to retrieve the subset using the hash results.

19. The apparatus of claim 17, wherein the processor is configured to generate a cacheable universal resource indicator that points to the subset and is described by the hash results for the string for storage and use by the service provider and clients.

20. The apparatus of claim 17, wherein the processor is further configured to generate a signature for content of the token, and to send the token with the signature to the client.

21. A system comprising the apparatus of claim 17, and the client, and wherein the client is configured to:
parse the received token;
for each hash results in the list, retrieve the corresponding subset; and
search for a resource and operation that are associated with a user interface element.

22. The apparatus of claim 17, wherein the processor is configured to generate a notification via a publish/subscribe mechanism when it is determined that an existing token is no longer valid.

23. The computer readable storage media of claim 17, further comprising instructions operable to store the subset in a distributed hash table of {resource,operations} tuples based on the hash results that is accessible to the service provider so that the service provider is able to retrieve the subset using the hash results.

24. The method of claim 1, wherein the generating further includes generating multiple prefixes each to indicate a corresponding service provider and separating hash results according to associated prefixes such that a service provider with a same prefix is included in a same list of hash results.

25. The computer readable storage media of claim 14, further comprising instructions operable to generate multiple prefixes each to indicate a corresponding service provider and to separate hash results according to associated prefixes such that a service provider with a same prefix is included in a same list of hash results.

26. The apparatus of claim 17, wherein the processor is further configured to generate multiple prefixes each to indicate a corresponding service provider and to separate hash results according to associated prefixes such that a service provider with a same prefix is included in a same list of hash results.

* * * * *